(12) United States Patent
Avinger

(10) Patent No.: US 6,857,608 B2
(45) Date of Patent: Feb. 22, 2005

(54) ADJUSTABLE WREATH HANGER

(75) Inventor: Andrew G. Avinger, Lubbock, TX (US)

(73) Assignee: Emerald Innovations, Inc., Butler, PA (US)

( * ) Notice: Subject to any disclaimer, the term of this patent is extended or adjusted under 35 U.S.C. 154(b) by 0 days.

(21) Appl. No.: 09/779,799

(22) Filed: Feb. 8, 2001

(65) Prior Publication Data

US 2002/0104937 A1 Aug. 8, 2002

(51) Int. Cl.$^7$ .............................................. A47B 96/06
(52) U.S. Cl. .................. 248/215; 248/222.11; 248/304; 248/307; 248/339
(58) Field of Search .................... 248/215, 222.11, 248/224.7, 295.11, 297.31, 301, 304, 307, 322, 339, 496; 211/113, 117, 119.004

(56) References Cited

U.S. PATENT DOCUMENTS

| 599,325 | A | * | 2/1898 | Fitzgerald |
| 972,579 | A | * | 10/1910 | Shepard |
| 1,242,309 | A | * | 10/1917 | Backerud |
| 2,743,023 | A | * | 4/1956 | Larson .......................... 211/96 |
| 3,536,287 | A | * | 10/1970 | Hyman ......................... 248/301 |
| 3,891,176 | A | * | 6/1975 | Downing et al. ........... 248/340 |
| 4,223,864 | A | * | 9/1980 | Harlow |
| 4,335,864 | A | * | 6/1982 | Merlini .................... 248/316.7 |
| 4,557,455 | A | * | 12/1985 | Benjamin |
| D304,545 | S | * | 11/1989 | Hurrelbrink ................. D8/373 |
| 5,413,297 | A |   | 5/1995 | Adams ........................ 248/215 |
| D360,355 | S | * | 7/1995 | Adams ........................ D8/367 |
| D365,015 | S |   | 12/1995 | Avinger ....................... D8/373 |
| 5,535,971 | A |   | 7/1996 | Adams ........................ 248/215 |
| 5,553,823 | A |   | 9/1996 | Protz, Jr. .................... 248/304 |
| D374,168 | S |   | 10/1996 | Protz, Jr. .................... D8/373 |
| 5,607,131 | A |   | 3/1997 | Adams ........................ 248/215 |
| 5,645,178 | A | * | 7/1997 | Conley, Jr. ............... 211/87.01 |
| 6,299,118 | B1 | * | 10/2001 | Farrell ........................ 248/327 |
| 6,311,851 | B1 | * | 11/2001 | Knudsen, Sr. et al. |

FOREIGN PATENT DOCUMENTS

EP          0309142 A1 *   3/1989

* cited by examiner

Primary Examiner—Korie Chan
(74) Attorney, Agent, or Firm—Calfee, Halter & Griswold, LLP

(57) ABSTRACT

An adjustable wreath hanger, preferably made of molded plastic, is disclosed herein that preferably comprises a hanger strip attachable to the top of a door or other object and a hook strip that slidably engages the hanger strip to permit selective variation of the distance between a rearwardly facing door hook and a forwardly facing wreath hook. The hanger strip preferably comprises a plurality of forwardly facing detent members into which a tooth projecting rearwardly from an engagement tab on the hook strip can be selectively engaged or disengaged to vary the relative positions of the two strips, thereby effectively elongating the length of the wreath hanger.

14 Claims, 3 Drawing Sheets

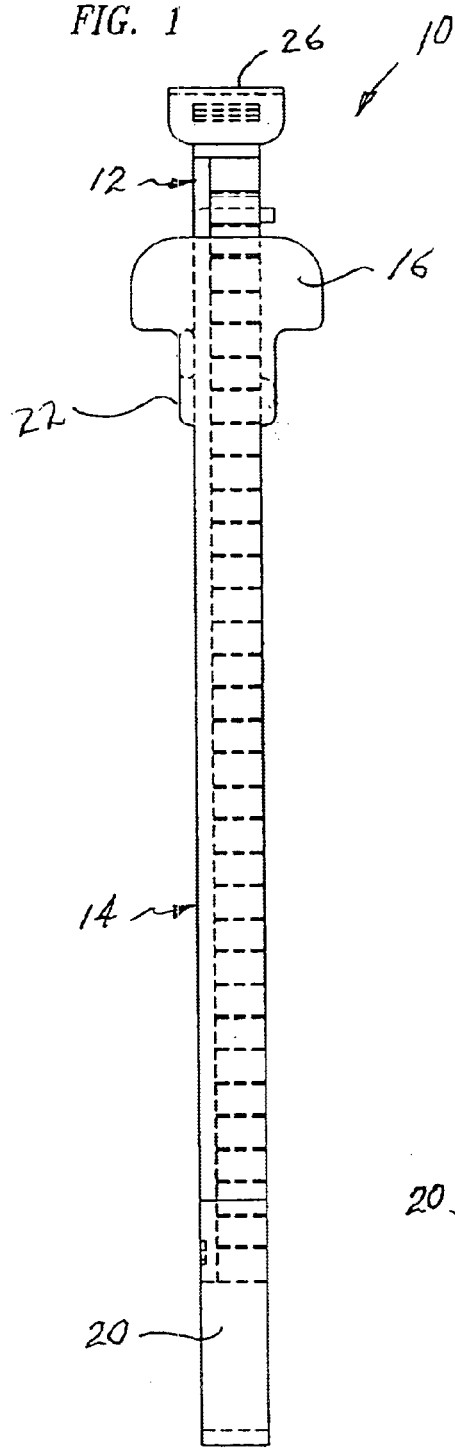
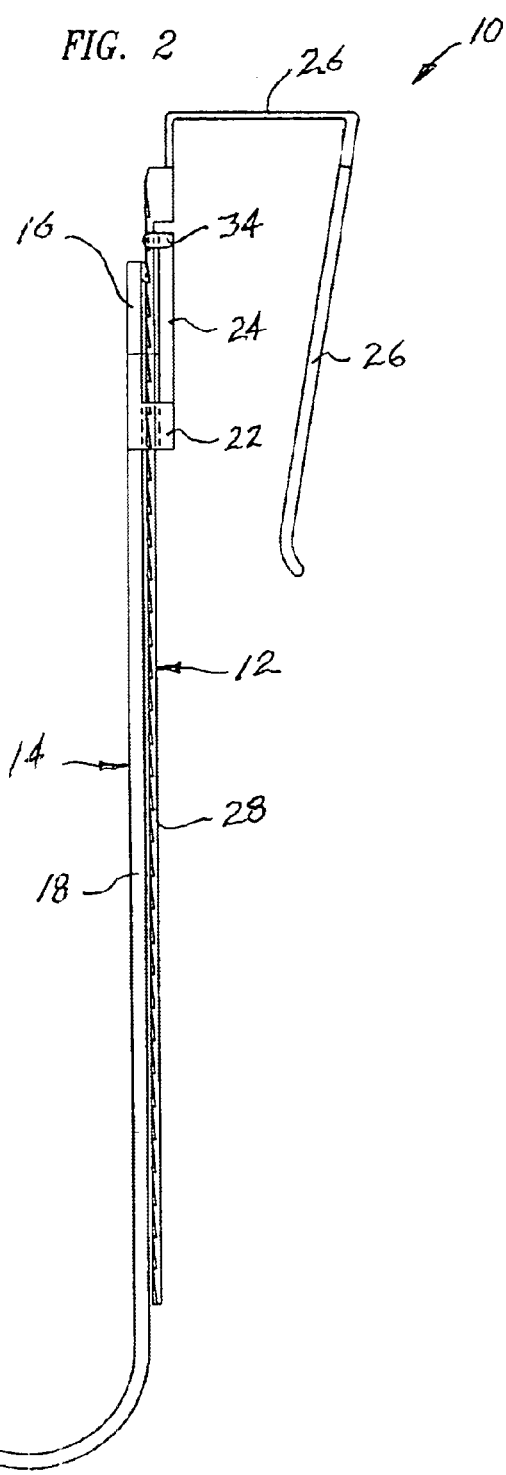

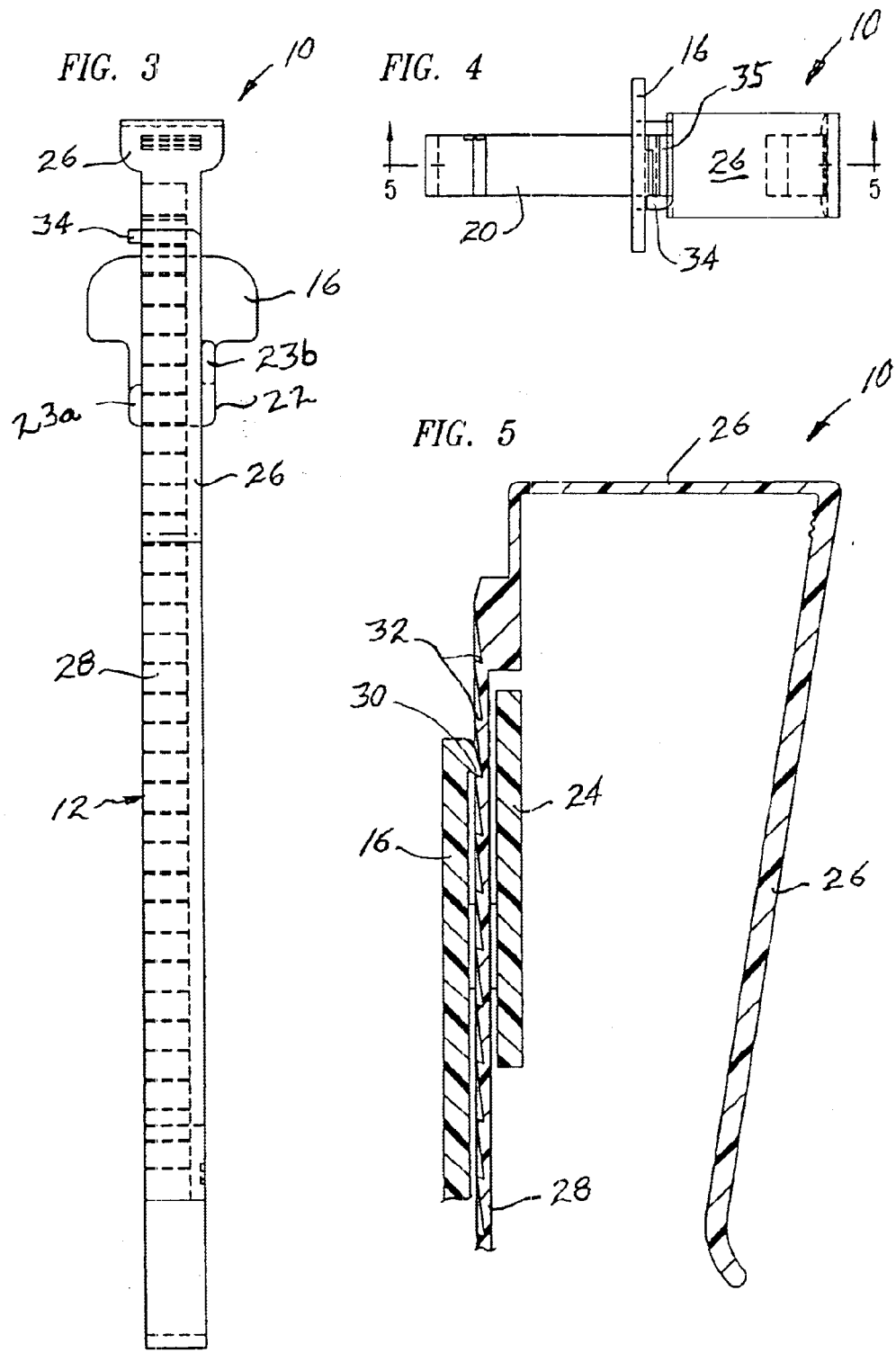

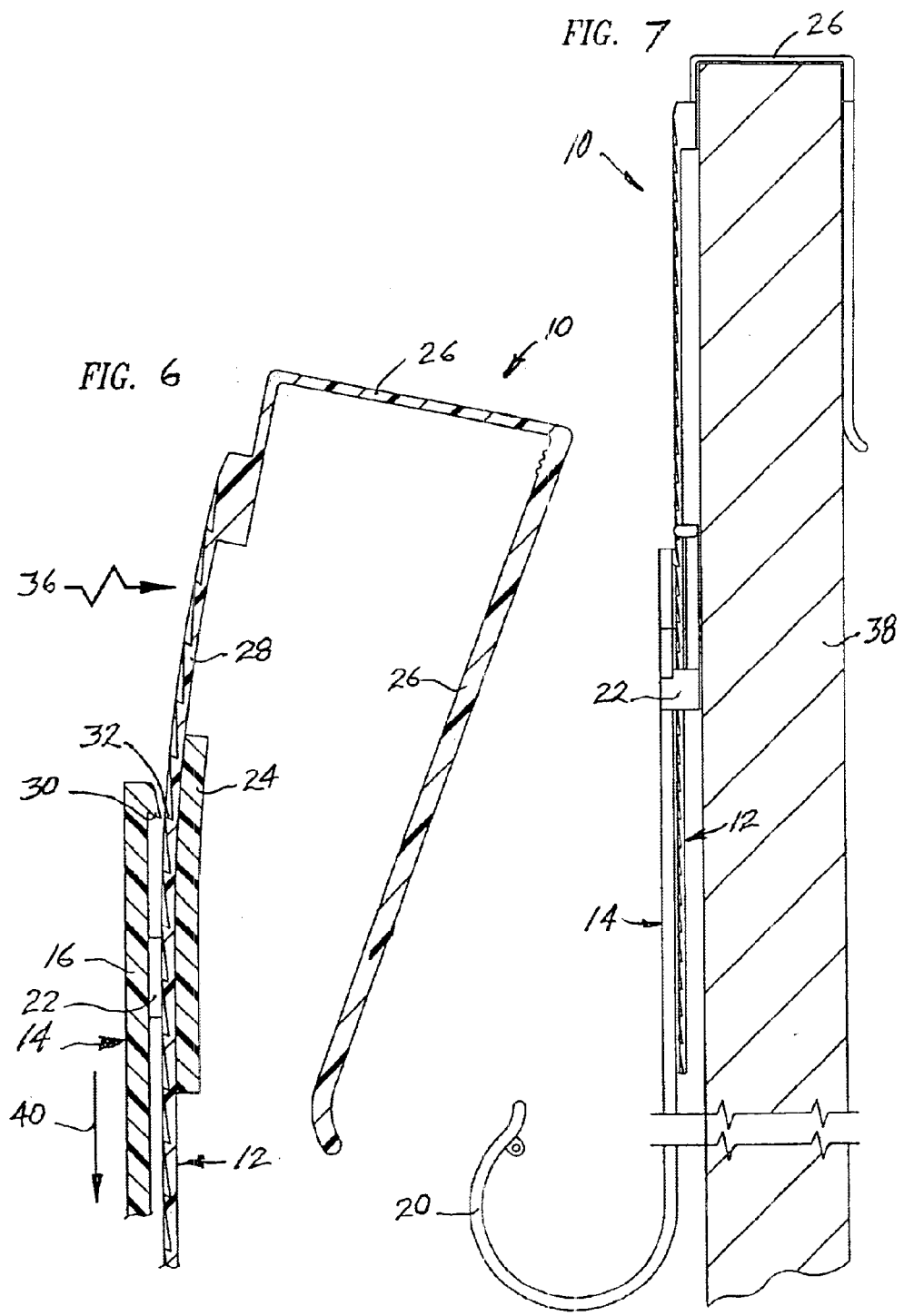

ADJUSTABLE WREATH HANGER

BACKGROUND OF THE INVENTION

1. Field of the Invention

This invention relates to a molded plastic article that is useful for supporting an object such as a decorative wreath or garland against the front surface of a door, over a cemetery headstone, or the like. More particularly, the invention relates to a molded plastic wreath hanger having a rearwardly facing "over-the-door" hook and also having a forwardly facing wreath-support hook, with the distance between the two hooks being selectively adjustable by the user.

2. Description of Related Art

Molded plastic wreath hangers are previously known, having been disclosed, for example, in U.S. Des. Pat. No. 365,015. Because the preferred distance from the top of the door to the forwardly facing support hook on the face of a door can vary according to factors such as the height of the door, size of the wreath, etc., molded plastic wreath hangers made so as to permit selective adjustment of that distance by the user are desirable. In the past, some manufacturers addressed this need by producing molded hangers of different lengths. More recently, U.S. Pat. No. 5,553,823 and U.S. Des. Pat. No. 374,168 disclosed wreath hangers having extension members of predetermined lengths that can be inserted by the user between the "over-the-door" hook and the forwardly facing hook to vary the overall length of the hanger. Unfortunately, such hangers limit the degree of adjustability according to the predetermined lengths of the extension members. U.S. Pat. No. 5,413,297 discloses a wreath hanger having a bracket having a locking nub that is used in combination with a separate hook arm, but that structure is not seen to be adjustable to vary the vertical separation between the top of the door and the hook.

A wreath hanger is therefore needed that is easily and selectively adjustable by the user to position the forwardly facing hook member of a wreath hanger a desired distance below the top of a door from which it hangs.

SUMMARY OF THE INVENTION

An adjustable wreath hanger, preferably made of molded plastic, is disclosed herein that preferably comprises a hanger strip attachable to the top of a door or other object and a hook strip that slidably engages the hanger strip to permit selective variation of the distance between a rearwardly facing door hook and a forwardly facing wreath hook. The hanger strip preferably comprises a plurality of forwardly facing detent members into which a tooth projecting rearwardly from an engagement tab on the hook strip can be selectively engaged or disengaged to vary the relative positions of the two strips, thereby effectively elongating the length of the wreath hanger.

BRIEF DESCRIPTION OF THE DRAWINGS

The apparatus of the invention is further described and explained in relation to the following figures of the drawings wherein:

FIG. 1 is a front elevation view of a preferred embodiment of the adjustable wreath hanger of the invention;

FIG. 2 is a right side elevation view of the adjustable wreath hanger of FIG. 1;

FIG. 3 is a rear elevation view of the adjustable wreath hanger of FIG. 1;

FIG. 4 is a top plan view of the adjustable wreath hanger of FIG. 2;

FIG. 5 is an enlarged, cross-sectional view taken along line 5—5 of FIG. 4, with the lower portions of the hook and hanger strips being broken away;

FIG. 6 is a cross-sectional view similar to that of FIG. 5, but with the upper portion of the hanger strip being flexed rearwardly to disengage the tooth of the hook strip from a detent of the hanger strip, thereby permitting the hook strip to be adjusted downwardly relative to the hanger strip; and FIG. 7 is a side elevation view as in FIG. 2, but shown installed on a door with the hook strip being adjusted downwardly relative to the hanger strip from the position shown in FIG. 2.

Like reference numerals are used to indicate like parts in all figures of the drawings.

DESCRIPTION OF THE PREFERRED EMBODIMENTS

Referring to FIGS. 1–4, adjustable wreath hanger 10 of the invention preferably comprises elongated hanger strip 12 and elongated hook strip 14, both of which are preferably injection molded from a suitable thermoplastic resin, most preferably polycarbonate. Hanger strip 12 further comprises a rearwardly facing hook member 26 at its upper end. Hook member 26 is preferably constructed in such manner that it will fit snugly over the top of a conventional door, and sufficiently resilient that it can accommodate doors of various thicknesses within an acceptable, predetermined range. The portion of hanger strip 12 extending downwardly from hook member 26 preferably comprises a detent section 28 having a plurality of vertically separated, forwardly facing detent members 32.

Hook strip 14 further comprises a forwardly facing hook 20 at or near its lower end and an upwardly extending strip portion 18 having disposed near its upper end a resilient engagement tab 16 having a rearwardly facing projection 30, a slide member 22 attached to end cooperating with engagement tab 16 to define an aperture 35 through which downwardly extending detent section 28 of hanger strip 12 is insertable to create an interfering fit between rearwardly facing projection 30 and detent members 32. Slide member 22 preferably further comprises an upwardly extending, resilient backing tab 24 spaced part from rearwardly facing projection 30, the backing tab biasing an aligned detent member 32 of hanger strip 12 into engagement with rearwardly facing projection 30 of hook strip 14 to maintain a predetermined vertical separation between door hook 26 and hook 20 during use. Rearwardly facing projection 30 and detent members 32 are preferably shaped so as to enable the projection 30, preferably an angular tooth having a width slightly less than the width of strip portion 18, to override detent members 32 whenever the hook strip slides upwardly relative to the hanger strip. Rearwardly projecting bosses 23a and 23b on the back of engagement tab 16 assist in keeping strip portion 18 and detent section 28 cooperatively aligned whenever hanger strip 12 and hook strip 14 are moved in slidable relation to each other.

Referring to FIG. 5, when adjustable wreath hanger 10 is constructed as described above, hook strip 14 can be moved upwardly over hanger strip 12 with little effort when not under load to shorten the vertical separation between door hook 26 and hook 20. However, backing tab 24 preferably has a forwardly extending projection 34, visible in FIGS. 2–4, that biases detent members 32 of hanger strip 12 against rearwardly facing projection 30 to prevent hook strip 14 from sliding downwardly in relation to the hanger strip 12 whenever hook 20, visible in FIGS. 1, 2 and 4, is under load. Therefore, in order to increase the vertical separation between door hook 26 and hook member 20 when desired, detent section 28 must first be flexed backwardly away from engagement tab 16 and rearwardly facing projection 30. This adjustment is most easily accomplished when hook 20 is not under load and when door hook 26 is not attached to a door.

Referring to FIG. 6, the application of a rearwardly directed manual force as signified by arrow 36 against detent section 28 causes backing tab 24 to flex rearwardly as well, creating separation between rearwardly facing projection 30 and forwardly facing detent member 32. This separation allows slide 22 of hook strip 14 to be moved downwardly relative to hook strip 12 as indicated by arrow 40. When the desired vertical separation between door hook 26 and hook 20 is achieved, force 36 can be withdrawn, enabling backing tab 24 to bias whatever detent member 32 is then aligned with rearwardly facing projection 30 back into engagement with projection 30, "locking" hanger strip 12 and hook strip 14 back into substantially fixed relation to each other when hook 20 is placed under load.

FIG. 7 depicts adjustable wreath hanger 10 of the invention installed over door 38, with hook strip 14 shifted downwardly relative to hanger strip 12 as compared to the positions depicted in FIGS. 1–4, thereby increasing the vertical separation between door hook 26 and hook 20.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. An adjustable wreath hanger comprising:
   an elongated hanger strip comprising an upper end and a downwardly extending end, said upper end comprising a rearwardly facing, resilient door hook, and said downwardly extending end comprising a plurality of vertically separated, forwardly facing detent members; and
   an elongated hook strip comprising a lower end and an upper end, said lower end comprising a forwardly facing hook member, and said upper end comprising a resilient engagement tab having a rearwardly facing projection, a slide member attached to and cooperating with the upper end of the hook strip to define an aperture through which the downwardly extending end of the hanger strip is insertable to create an interfering fit between the rearwardly facing projection of the hook strip and the detent members of the hanger strip, the slide member further comprising an upwardly extending, resilient backing tab spaced apart from the rearwardly facing projection, the resilient backing tab biasing one of said forwardly facing detent members aligned therewith of the hanger strip into engagement with the rearwardly facing projection of the hook strip to maintain a predetermined vertical separation between the door hook and the forwardly facing hook member during use.

2. The adjustable wreath hanger of claim 1 wherein the rearwardly facing projection and the detent members are shaped so as to enable the rearwardly facing projection to override the detent members whenever the hook strip slides upwardly relative to the hanger strip.

3. The adjustable wreath hanger of claim 1 wherein the backing tab has a top end with a forwardly extending projection that biases the detent member of the hanger strip against the rearwardly facing projection to prevent the hook strip from sliding downwardly in relation to the hanger strip.

4. The adjustable wreath hanger of claim 3 wherein the rearwardly facing projection is selectively disengageable from the detent members of the hanger strip by the application of a rearwardly directed force to the hanger strip at a point above the top of the backing tab.

5. The adjustable wreath hanger of claim 1 wherein the rearwardly facing projection is a molded plastic tooth.

6. The adjustable wreath hanger of claim 1 wherein the hanger strip and the hook strip are molded from polycarbonate resin.

7. The adjustable wreath hanger of claim 1 wherein the rearwardly facing projection is selectively disengageable from the detent members of the hanger strip by the simultaneous application of a forwardly directed force to the resilient engagement tab and a rearwardly directed force to the backing tab, thereby enabling the free movement of the hook strip in an upward or downward direction.

8. An adjustable wreath hanger comprising:
   an elongated hanger strip comprising an upper end and a downwardly extending end, said upper end comprising a rearwardly facing, resilient door hanger, and said downwardly extending end comprising a series of vertically separated recesses diaposed on the forward surface of the hanger strip; and
   an elongated hook strip comprising a lower hook end and an upper engagement end, said lower hook end comprising a forwardly facing hook member, and said upper engagement end comprising a slide member comprising a resilient backing tab, and a resilient engagement tab comprising a rearwardly facing projection, and
   wherein the slide member defines an aperture through which the downwardly extending end of the hanger strip is insertable to align the hanger strip with the hook strip, and
   wherein the resilient backing tab of the slide member opposes the rearwardly facing projection of the resilient engagement tab such that when the downwardly extending portion of the hanger strip is inserted into the aperture defined by the slide member the resilient backing tab biases one of said vertically separated recesses aligned therewith of the hanger strip into engagement with the rearwardly facing projection of the hook strip to maintain a predetermined vertical separation between the door hook and the forwardly facing hook member during use, and
   wherein the rearwardly facing projection is selectively disengageable from the vertically separated recesses of the hanger strip by the simultaneous application of a forwardly directed force to the resilient engagement tab and a rearwardly corrected force to the backing tab, thereby enabling the free movement of the hook strip in an upward or downward direction.

9. An adjustable wreath hanger comprising:
   a hanger strip comprising a top portion, an elongated first downwardly-extending portion having a first end and a second end and attached at its first end to a first end of the top portion and arranged at a right angle relative to the top portion, the first downwardly extending portion having at its second end a plurality of vertically separated, detent members disposed on the forward-facing surface of the hanger strip, and a second downwardly-extending, rearwardly-facing portion having a first end and a second end and opposing the first downwardly extending portion, and said second downwardly-extending, rearwardly-facing portion being a resilient member attached at its first end to a second end of the top portion, and arranged at an acute angle relative to the top portion; and an elongated hook strip having a lower end comprising a forwardly facing hook member, and an upper portion comprising a resilient engagement tab having a rearwardly facing projection, and further comprising a slide member that defines an aperture through which the downwardly extending portion of the hanger strip is insertable to align the hanger strip with the hook strip and to create an interfering fit between the rearwardly facing projection and the detent members, the slide member further comprising a resilient backing tab opposing the rearwardly facing projection, the backing tab biasing one of said forwardly facing detent members aligned therewith of the hanger strip into engagement with the rearwardly facing projection of the hook strip to maintain a predetermined vertical separation between the door hook and the forwardly facing hook member during use.

10. An adjustable wreath hanger comprising:

an elongated hanger strip having an upper end comprising a rearwardly facing, resilient door hanger and a downwardly extending portion having a plurality of vertically separated, detent members disposed on the forward surface of the hanger strip; and an elongated hook strip having a lower end comprising a forwardly facing hook member, and upper portion comprising a resilient engagement tab having a rearwardly facing projection, and further comprising a slide member that defines an aperture through which the downwardly extending portion of the hanger strip is insertable to create an interfering fit between the rearwardly facing projection and the detent members, the slide member further comprising a resilient backing tab opposing the rearwardly facing projection, wherein the rearwardly facing projection is selectively disengageable from the detent members of the hanger strip by the simultaneous application of a forwardly directed force to the resilient engagement tab and a rearwardly directed force to the backing tab, thereby enabling the free movement of the hook strip in an upward or downward direction, the backing tab having a projection that biases the detent member of the hanger strip against the rearwardly facing projection to keep the hook strip and the hanger strip cooperatively aligned when the hook is under load, and biasing one of said forwardly facing detent members aligned therewith of the hanger strip into engagement with the rearwardly facing projection of the hook strip to maintain a predetermined vertical separation between the door hook and the forwardly facing hook member during use.

11. An adjustable wreath hanger comprising:

a hanger strip comprising:
  a top portion having a first and second end,
  an elongated first downwardly-extending portion having a first and a second end and attached at its first end to the first end of the top portion and arranged at a right angle relative to the top portion, the first downwardly extending portion having at its second end a plurality of vertically separated recesses disposed on the second end of the first downwardly-extending portion, and
  a second downwardly-extending portion comprising a first and a second end which is attached at its first end to the second end of the top portion, and is arranged at an acute angle relative to the top portion such that the second downwardly-extending portion opposes the first downwardly extending portion; and a hook strip comprising:
  a lower end comprising a forwardly facing hook member, and
  an upper end comprising a resilient engagement tab wherein said engagement tab comprises a rearwardly facing projection, a slide member that defines an aperture through which the first downwardly extending portion of the hanger strip is insertable to align the hanger strip with the hook strip to create an interfering fit between the rearwardly facing projection and the vertically separated recesses of the first downwardly extending portion of the hanger strip, the slide member comprising a resilient backing tab opposing the rearwardly facing projection, the backing tab biasing one of said vertically separated recesses aligned therewith of the first downwardly extending portion of the hanger strip into engagement with the rearwardly facing projection of the hook strip to maintain a predetermined vertical separation between the door hook and the forwardly facing hook member during use.

12. The adjustable wreath hanger of claim 11, wherein said hanger strip can be mounted over a door such that the top portion rests on the top of the door, the first downwardly extending portion rests substantially flat on one face of the door, and the second downwardly extending portion opposes said first downwardly extending portion on an opposite face of the door, and adjustably flexes to accommodate doors of various thicknesses.

13. The adjustable wreath hanger of claim 11, wherein the second end of the second downwardly-extending portion comprises a rearwardly-facing hook member.

14. An adjustable wreath hanger comprising:

an elongated hanger strip having an upper end comprising a rearwardly facing, resilient door hook and a downwardly extending portion having a plurality of vertically separated, forwardly facing detent members; and an elongated hook strip having a lower end comprising a forwardly facing hook member, and upper portion comprising a resilient engagement tab having a rearwardly facing projection, a slide member attached to and cooperating with the upper portion of the hook strip to define an aperture through which the downwardly extending portion of the hanger strip is insertable to create an interfering fit between the rearwardly facing projection and the detent members, the slide member further comprising an upwardly extending, resilient backing tab spaced apart from the rearwardly facing projection, the backing tab biasing one of said forwardly facing detent members aligned therewith of the hanger strip into engagement with the rearwardly facing projection of the hook strip to maintain a predetermined vertical separation between the door hook and the forwardly facing hook member during use, and wherein the backing tab has a top end with a forwardly extending projection that biases the detent member of the hanger strip against the rearwardly facing projection to prevent the hook strip from sliding downwardly in relation to the hanger strip, and wherein the rearwardly facing projection is selectively disengageable from the detent members of the hanger strip by the application of a rearwardly directed force to the hanger strip at a point above the top of the backing tab.

* * * * *